United States Patent [19]
Atkins, Sr.

[11] 3,722,127
[45] Mar. 27, 1973

[54] HOOK-SETTING FISHING ROD HOLDER

[76] Inventor: Vern A. Atkins, Sr., 4118 N. Sheridan, Indianapolis, Ind. 46226

[22] Filed: Nov. 16, 1970

[21] Appl. No.: 89,635

[52] U.S. Cl. .................................................. 43/15
[51] Int. Cl. ............................................ A01k 97/00
[58] Field of Search ................................... 43/15, 16

[56] References Cited

UNITED STATES PATENTS

| | | | |
|---|---|---|---|
| 2,986,834 | 6/1961 | Irwin | 43/15 |
| 2,918,746 | 12/1959 | Hamrick | 43/15 |
| 2,964,868 | 12/1960 | Bennett | 43/15 |

FOREIGN PATENTS OR APPLICATIONS

| | | | |
|---|---|---|---|
| 1,378,920 | 10/1964 | France | 43/15 |

Primary Examiner—Louis G. Mancene
Assistant Examiner—Daniel J. Leach
Attorney—Woodard, Weikart, Emhardt & Naughton

[57] ABSTRACT

Disclosed is a member establishing the attitude of a fishing rod attached to it, the member being held in a substantially horizontal position by the over-center position of a toggle assembly. A trigger lever, actuated by a relatively light pull on the fishing line, nudges the toggle assembly back across center when the line is pulled to snap the member, and hence the tip of the fishing rod sharply upwardly. The mechanism is distinguished by the fact that triggering or release occurs without the necessity of exerting a force large enough to overcome that exerted by the over-center toggle spring.

2 Claims, 4 Drawing Figures

INVENTOR.
VERN A. ATKINS, SR.
BY
Woodard, Weikart, Emhardt & Naughton
ATTORNEYS

HOOK-SETTING FISHING ROD HOLDER

BACKGROUND OF THE INVENTION

Fishing rod holders which utilize toggle actuated mechanism for automatically setting the hook after a fish has pulled on the fishing line are not unknown in the prior art. The structures disclosed in U.S. Pat. Nos. 2,986,834 and 3,451,155 are typical of these prior art devices. In these devices, release of the toggle mechanism, whipping the pole tip upwardly to provide the necessary hook-setting action, can only occur only after a pulling force is exerted on the line large enough to overcome the force exerted by the over-center spring. The pull force exerted to trip the mechanism must be momentarily larger than the oppositely directed force exerted by the spring while the mechanism is in cocked position. The relatively strong pull on the line necessary for tripping, a requirement inherent in these prior art structures, greatly diminishes the adaptability of these rod holders for various types of fish and various fishing techniques.

The structure of the present invention utilizes a lever member, moved by a relatively light line tug, for nudging one element of the toggle mechanism back across center to release the force stored in the over-center spring when the over-center linkage is cocked. This relatively large force stored in the over-center spring is released to whip the pole tip upwardly by movement of the line-actuated triggering lever, and the force necessary to provide triggering movement of this lever is far less than the force exerted by the over-center spring in cocked position. The over-center linkage, triggering lever and pole gripping components of the complete assembly are all of simple configuration and can be economically manufactured. The assembly utilizes a minimum number of component parts, and the triggering force can be simply adjusted to make the device adaptable to varied fishing techniques and to the behavior characteristics of various types of game fish.

DESCRIPTION OF THE PREFERRED EMBODIMENT

Figures 1, 2, 3, 4:
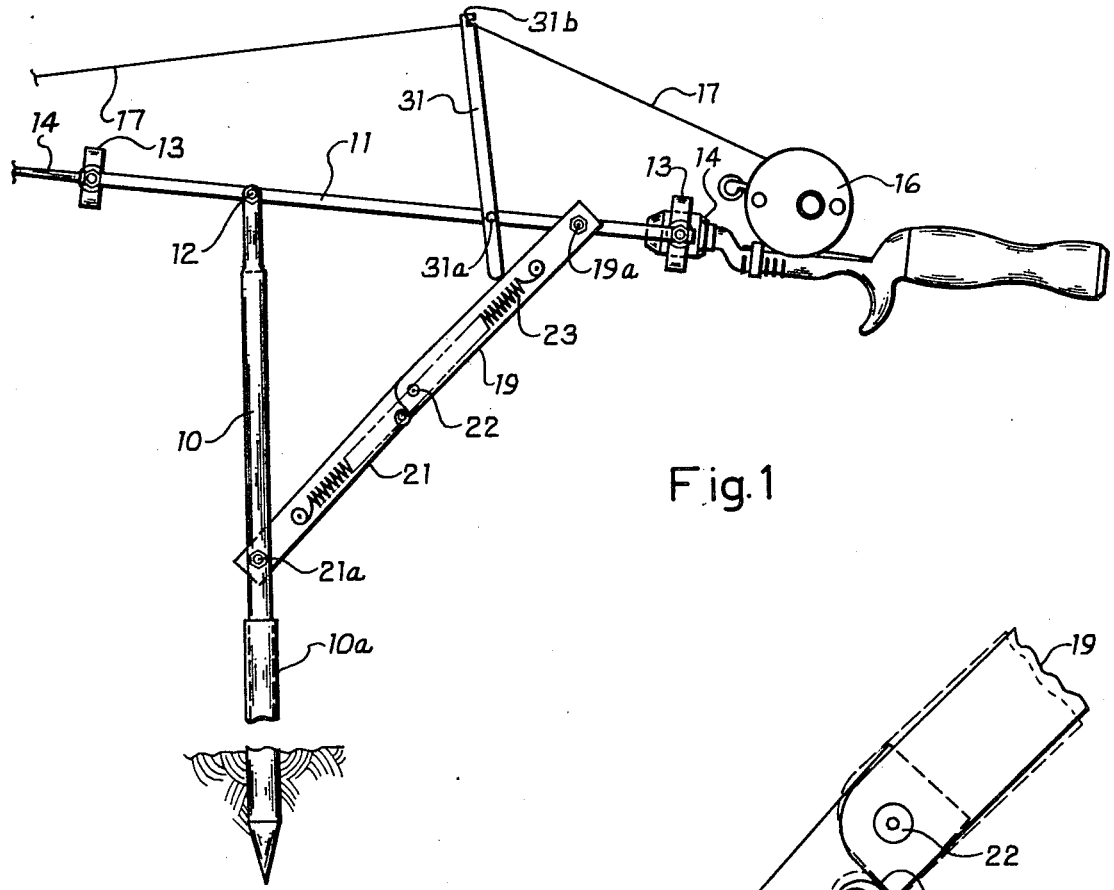
FIG. 1 is a side view of a fishing rod holder assembly embodying the present invention.
FIG. 2 is an enlarged fragmentary view of a portion of the structure shown in FIG. 1 with the toggle members in actuated position.
FIG. 3 is an enlarged fragmentary view of the toggle members shown in FIG. 2.
FIG. 4 is a perspective, fragmentary view of a portion of the apparatus shown in FIG. 1.

Referring in FIG. 1, the hook-setting fishing rod holder assembly includes an upright support member 10 which may have telescoping fit with a socket member 10a adapted to be driven into the ground adjacent the body of water in which fishing is to be carried out. It will be understood that the support member 10 might also take the form of a member adapted along its length for rigid clamping to the side of a boat. Pivotally connected to the support member 10 and extending transversely to it is a rod holder element 11, the pivotal connection of the rod holder element being intermediate its ends at 12.

The elongated holder element 11, as may best be seen in FIG. 4, carries spaced clamps 13 which are adapted to detachably accommodate a conventional fishing rod 14, the rod 14 having a conventional reel 16 from which fishing line 17 extends along the rod.

Extending diagonally between the holder element 11 and the support member 10 are toggle members 19 and 21. The toggle link 19 is pivotally connected at 19a to the rod holder element 11 and the toggle member 21 is pivotally connected at 21a to the support member 10, the adjacent ends of the toggle members 19 and 21 being pivotally connected together at 22. A resilient means taking the form of the tension spring 23 extends between the toggle members 19 and 21.

Referring to FIG. 3, an eccentrically mounted disc 24 provides an abutment surface at its marginal edge against which the end 19b of the toggle member 19 rests. The position of the adjustable disc 24 thus provides an abutment which defines the over-center cocked position of the toggle members, such position of the toggle members being shown in both FIGS. 1 and 3. It will be understood that by varying the position of the disc 24, because of its eccentric mounting, the over-center, cocked position of the toggle member 19 with respect to the toggle member 21 may be varied, a further position of the toggle members beyond the over-center position being illustrated in broken lines in FIG. 3. With the toggle members in their position of FIG. 1, the energy stored in the tension spring 23 as the toggle members are moved to this position serves to hold the toggle members in cocked position with the axis of pivotal mounting 22 slightly above a line joining the axes of pivotal mountings 21a and 19a. With the toggle members in this position, the rod holder element 11, and the fishing rod accommodated on it, are in a slightly inclined position as shown in FIG. 1.

The means for tripping or triggering the toggle members takes the form of a trigger member or lever 31 which is pivotally mounted at 31a to the rod holder element, the pivot mounting 31a being relatively closely adjacent to the pivotal mounting 19a for the toggle member 19. The upper end of the lever 31 is notched as indicated at 31b so as to accommodate the fishing line 17. The lower end of the lever 31 rests against the side margin of the toggle member 19.

In operation, with the assembly components in their positions of FIG. 1, a sharp pull or jerk on the line 17, as occurs when a fish strikes the bait or lure, will move the lever 31 counter-clockwise about its pivot 31a, the lower end of the lever 31 thus nudging the toggle member 19, and its pivotal connection 22, back through center, whereupon the tension spring 23 releases its stored energy to snap the toggle members 19 and 21 into their actuated position shown in FIG. 2. This sharply tilts upwardly the rod holder element 11 and sharply elevates the tip of the fishing rod, setting the hook, the spring 23 thereafter serving to resist any subsequent lowering of the rod tip end by pulling on line 17.

It should be noted that the pivotal mounting 31a of the trigger member 31 is disposed so that a substantial mechanical advantage exists for the relatively light line pull needed to move the lower end of the lever 31 sufficiently to displace the toggle member 19, the area of contact of the lower end of the lever 31 with the toggle member 19 being relatively remote from the pivot 22 and close to the pivot 19a. The pull on line 17, necessary to trip the toggle mechanism, does not work against the force exerted by spring 23, that is, spring 23 need not be even momentarily overcome in order to trip the toggle mechanism. The apparatus has a minimum of components and these are relatively simple in configuration, the assembly thus being capable of economic manufacture.

I claim:

1. A hook-setting fishing rod holder assembly comprising a support member, a rod holder element extending transversely to and pivotally supported intermediate its ends on said support member and adapted to detachably accommodate a fishing rod in generally parallel relation with said holder element, pivotally joined toggle members extending diagonally between and pivotally joined at their outer ends to said rod holder element and said support member respectively, an abutment adjacent the pivotally joined adjacent ends of said toggle members and adapted to be engaged by one of the toggle members to determine the over-center cocked position of the toggle members, resilient means acting on said toggle members and capable when said toggle members are moved through center from their cocked position of sharply releasing the energy stored in the resilient means when said toggle members are in cocked position to thereby snap said toggle member outer ends toward each other and to thus sharply tilt said rod holder element with relation to said support member, and a trigger member on said rod holder element adapted to be moved by the fishing line carried on the fishing rod accommodated on said rod holder element, said trigger element engaging one of said toggle members to move it over-center from its cocked position and thereby release the stored energy of said resilient means to sharply tilt said rod holder element and the fishing rod accommodated thereon.

2. A fishing rod holder as claimed in claim 1 in which said trigger member takes the form of a lever pivotally supported intermediate its ends on said rod holder element closely adjacent the pivotal connection of the toggle link to the rod holder element, with one end of said lever accommodating the fishing line and the other end engaging said rod holder element attached toggle member.

* * * * *